UNITED STATES PATENT OFFICE.

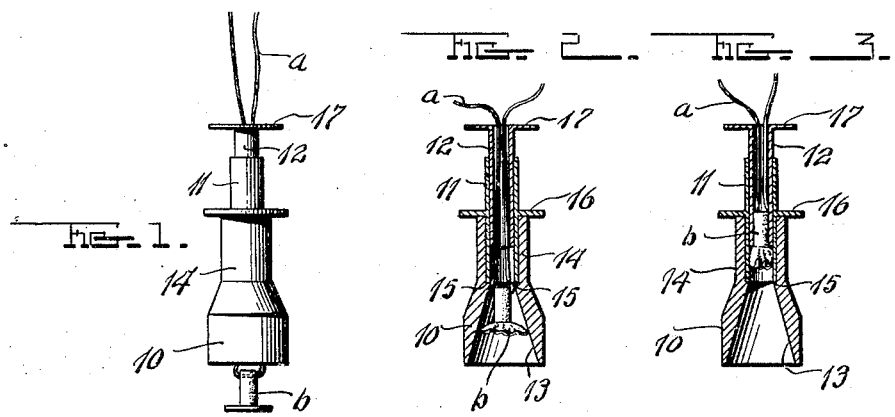
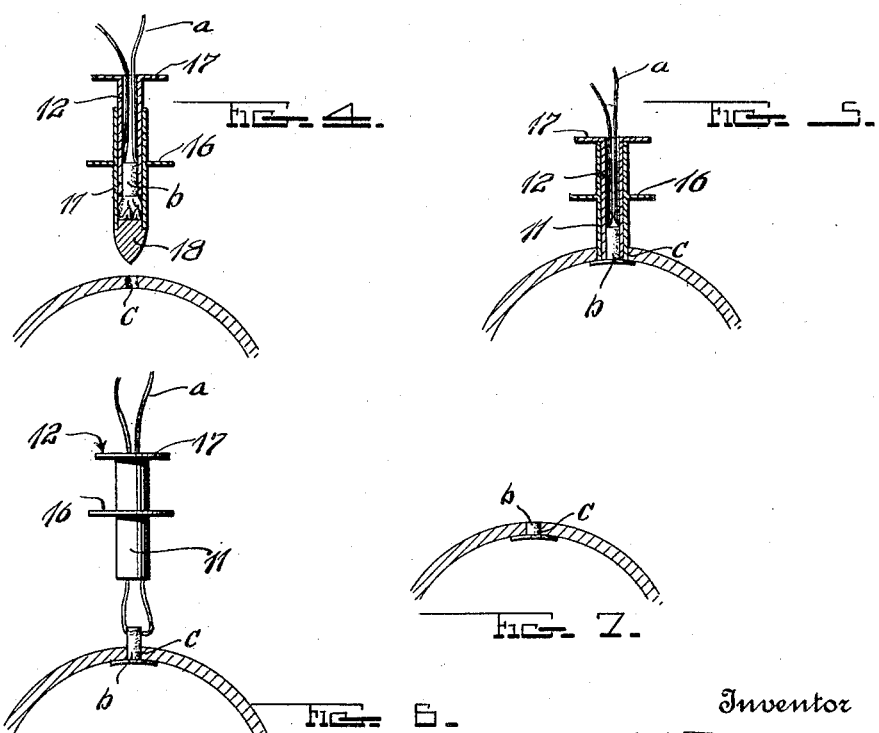

WILLIAM C. RANNEY, OF ELBRIDGE, NEW YORK.

TIRE-REPAIRING TOOL.

1,332,412.   Specification of Letters Patent.   Patented Mar. 2, 1920.

Application filed June 24, 1918. Serial No. 241,619.

*To all whom it may concern:*

Be it known that I, WILLIAM C. RANNEY, a citizen of the United States, residing at Elbridge, in the county of Onondaga and State of New York, have invented certain new and useful Improvements in Tire-Repairing Tools; and I do declare the following to be a full, clear, and exact description of the invention, such as will enable others skilled in the art to which it appertains to make and use the same.

This invention relates to tire repairing tools, and it relates more particularly to an improved tool for repairing single tube tires.

One of the objects of this invention is to provide an improved tool whereby the ordinary rubber repair plug may be compressed into small space so as to be easily insertible through the puncture which is to be closed.

Another object is to provide for retaining the repair plug in its compressed condition while inserting the same.

Another object is to provide convenient and effective means for removing the compressed repair plug from the compressing means after it has been inserted.

Another object is to provide a repair tool of this character which is compact, strong, durable, convenient and thoroughly practicable; and Another object is to provide a device of this character which consists of few and simple parts, so as to be manufactured at the minimum expense.

Other objects and advantages may become apparent to persons who read the following details of description in connection with the accompanying drawings, in which:

Figure 1 is a side elevation of my improved tire-plugging tool in connection with an ordinary rubber plug and a string attached to the plug and extending through the tool;

Fig. 2 is a view somewhat similar to Fig. 1, except that the parts are in longitudinal section, and the rubber plug is in the position in which its compression is begun;

Fig. 3 is a view similar to Fig. 2, except that the compression of the rubber plug is completed;

Fig. 4 is a view similar to Fig. 3 except that the outer tubular element is removed, and an auxiliary element or removable point is inserted under the rubber plug;

Fig. 5 is a view showing the intermediate tubular element inserted in the tire, and the inner tubular element in the position it assumes when it has pushed the head of the rubber plug out of the intermediate tubular member.

Fig. 6 is a view illustrating the intermediate and inner elements after they have been removed from the puncture of the tire, the rubber plug being seated in the puncture; and Fig. 7 is a view illustrating the plug in its final position filling the puncture of the tire.

Referring to these drawings in detail, in which similar reference characters correspond with similar parts throughout the several views, the device consists of three elements 10, 11 and 12. The outer element 10 is formed with an inwardly inclined surface 13, a cylindrical surface 14 and a shoulder 15; the intermediate element 11 is tubular or substantially cylindrical, and is formed with a radial or annular flange 16 which constitutes a manipulative element, the latter extending radially beyond the adjacent end of the member 10; and the inner tubular element 12 is provided with a radial and annular flange 17 which also constitutes a manipulative element.

In the normal inoperative or carrying position of the device, the elements 10 and 11 are assembled as shown in Figs. 1, 2, 3 and 4, but the relation of the elements 11 and 12 is that which is shown in Fig. 5, so that a very compact and convenient arrangement is provided for storage in a tool kit. However, in its operative position, the tubular element 12 is in the position shown in Figs. 2, 3 and 4, so that room is provided within the intermediate tubular element 11 for receiving the head of the rubber plug.

In operation, the parts 10, 11 and 12 are arranged as shown in Figs. 1, 2 and 3, the string *a* is passed through the tool as shown in Fig. 1; the string *a* is now pulled so as to draw the plug *b* to the position shown in Fig. 2, in which the inclined surface 13 begins to compress and collapse the flange or head of the plug by folding it into alinement with the stem thereof; the pulling of the string is continued until the head of the plug is compressed within the tube 11, while the stem of the plug is disposed in the tubular element 12, and the lower end of the latter is against the head of the plug, as shown in Fig. 3; the outer cylindrical element 10 is now removed, and a removable point or leading element 18 is now inserted in the intermediate tubular element; the latter is now forced through the aperture c by means of the flange 16; the tubular element 12 is pushed inward against the head of the plug until the latter is forced out of the intermediate element into the tire together with the leading element 18; the elements 11 and 12 are removed from the puncture leaving the plug in the puncture and the leading element in the tire; it being understood that the number of leading elements 18 required is directly proportional to the number of plugs to be inserted. It is to be understood that before the plug is inserted in the tool, the inner end of the tool and exterior of the plug are thoroughly coated with rubber cement, the inner portion of the tire adjacent to the puncture also being thus coated, so that when the plug is seated in the position shown in Fig. 6, it is only necessary to cut off the outer end of the plug, as shown in Fig. 7. The stem of the plug fits loosely in the inner tubular element, so that it is easily withdrawn after the head of the plug spreads within the tire.

The flange 16 serves not only as a manipulative element to push the tube 11 into and pull it out of the puncture, but it also serves as a safety element to prevent the tube 11 from being pushed entirely through the puncture.

Although I have described this embodiment of my invention very specifically, it is to be understood that I may make changes within the scope of the inventive idea disclosed in the foregoing description and following claims.

What I claim as my invention is:

1. In a puncture repairing tool adapted to insert a collapsible plug having a head and a stem, the combination of a tubular element having an inwardly converging inner surface at one end, an intermediate tubular element slidable longitudinally in the other end of the first said tubular element, and an inner tubular element slidable longitudinally in said intermediate tubular element, said inwardly converging surface being effective to collapse the head of the plug when the latter is forced therethrough, said intermediate tubular element being effective to receive the plug's head and keep it collapsed, said inner tubular element being effective to receive the plug's stem therein and to press against the plug's head so as to force the latter out of the intermediate tube.

2. In a puncture repairing tool adapted to insert a collapsible plug having a head and a stem, the combination of a tubular element having an inwardly converging inner surface at one end, an intermediate tubular element slidable longitudinally in the other end of the first said tubular element and having a flange extending radially beyond the adjacent part of the first said tubular element, and an inner tubular element slidable longitudinally in said intermediate tubular element, said inwardly converging surface being effective to collapse the head of the plug when the latter is forced therethrough, said intermediate tubular element being effective to receive the plug's head and keep it collapsed, said inner tubular element being effective to receive the plug's stem therein and to press against the plug's head so as to force the latter out of the intermediate tubular element, said flange being effective to push the intermediate tubular element into a puncture and prevent it from passing entirely through the puncture.

3. In a puncture repairing tool adapted to insert a collapsible plug having a head and a stem, the combination of a tubular element having an inwardly converging inner surface at one end, an intermediate tubular element slidable longitudinally in the other end of the first said tubular element, and having a flange extending radially beyond the adjacent part of the first said tubular element, and an inner tubular element slidable longitudinally in said intermediate tubular element, and provided with a flange extending radially beyond the adjacent portion of the intermediate tubular element, said inwardly converging surface being effective to collapse the head of the plug when the latter is forced therethrough, said intermediate tube being effective to receive the plug's head and keep it collapsed, said inner tubular element being effective to receive the plug's stem therein and to press against the plug's head so as to force the latter out of the intermediate tube.

4. In a puncture-repairing tool for inserting a collapsible plug having a head and a stem, the combination of a tubular element having an inwardly converging inner surface and a cylindrical inner surface and a constricted opening between said inner surfaces, a second tubular element, and a third tubular element, the said second tubular element being insertible in the first said tubular element and being of a size to fit against the cylindrical inner surface and having its own inner surface flush with that of said constricted opening, whereby the intermediate tube may receive the plug while offering the minimum of resistance to the entrance of the plug thereinto, said third tubular element being longitudinally movable in said second tubular element and adapted to receive the plug's stem and press against the plug's head.

5. In a puncture repairing tool adapted to insert a collapsible plug having a head and a stem, the combination of an intermediate tubular element adapted to receive the plug's head and hold it collapsed, an inner tubular element movable longitudinally in said intermediate tubular element and adapted to receive the plug's stem and press against said head so as to eject the head from the intermediate tubular element and a member having an inwardly inclined inner surface to collapse the head of the plug, the inner end of said member being attachable to and removable from the plug-holding end of said intermediate tubular element.

6. In a puncture repairing tool adapted to insert a collapsible plug having a head and a stem, the combination of an intermediate tubular element adapted to receive the plug's head and hold it collapsed, an inner tubular element movable longitudinally in said intermediate tubular element and adapted to receive the plug's stem and press against said head so as to eject the head from the intermediate tubular element and a leading element adapted to enter and spread the puncture and being attachable to the plug-holding end of said intermediate tubular element and detachable therefrom by the operation of ejecting the plug's head from the intermediate tubular element.

In testimony whereof I have hereunto set my hand.

WILLIAM C. RANNEY.